(12) United States Patent
Patel

(10) Patent No.: US 8,529,685 B2
(45) Date of Patent: Sep. 10, 2013

(54) AZAPHTHALOCYANINES AND THEIR USE IN INK-JET PRINTING

(75) Inventor: Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 238 days.

(21) Appl. No.: 13/054,335

(22) PCT Filed: Aug. 12, 2009

(86) PCT No.: PCT/GB2009/051005
§ 371 (c)(1),
(2), (4) Date: Jan. 14, 2011

(87) PCT Pub. No.: WO2010/020802
PCT Pub. Date: Feb. 25, 2010

(65) Prior Publication Data
US 2011/0143106 A1   Jun. 16, 2011

(30) Foreign Application Priority Data

| Aug. 22, 2008 | (GB) | 0815349.6 |
|---|---|---|
| Oct. 9, 2008 | (GB) | 0818541.5 |
| Oct. 17, 2008 | (GB) | 0819029.0 |
| Oct. 17, 2008 | (GB) | 0819052.2 |
| Nov. 10, 2008 | (GB) | 0820504.9 |
| Nov. 10, 2008 | (GB) | 0820506.4 |

(51) Int. Cl.
*C09D 11/02*    (2006.01)
*C07D 487/22*    (2006.01)

(52) U.S. Cl.
USPC ............... 106/31.47; 106/31.49; 540/126

(58) Field of Classification Search
USPC ............ 106/31.47, 31.49; 540/124, 125, 540/126, 133, 134; 347/100; 428/195.1
See application file for complete search history.

(56) References Cited

U.S. PATENT DOCUMENTS

| 7,182,806 | B2 * | 2/2007 | Patel | 106/31.49 |
|---|---|---|---|---|
| 7,449,058 | B2 * | 11/2008 | Patel | 106/31.49 |
| 7,566,362 | B2 * | 7/2009 | Mori et al. | 106/31.47 |
| 7,575,626 | B2 * | 8/2009 | Patel | 106/31.47 |
| 7,575,627 | B2 * | 8/2009 | Patel | 106/31.47 |
| 7,585,361 | B2 * | 9/2009 | Yoneda et al. | 106/31.47 |
| 7,591,888 | B2 * | 9/2009 | Fujii et al. | 106/31.47 |
| 7,678,899 | B2 * | 3/2010 | Patel | 106/31.49 |
| 7,922,799 | B2 * | 4/2011 | Patel | 540/126 |
| 2008/0092771 | A1 * | 4/2008 | Wight et al. | 106/31.49 |
| 2008/0220230 | A1 * | 9/2008 | Watson et al. | 106/31.49 |
| 2009/0202798 | A1 * | 8/2009 | Patel | 540/126 |

FOREIGN PATENT DOCUMENTS

| EP | 1 741 756 | 1/2007 |
|---|---|---|
| JP | 11-302285 | 11/1999 |
| JP | 2002-338825 | 11/2002 |
| JP | 2004-75986 | 3/2004 |
| WO | WO 02/34844 | 5/2002 |
| WO | WO 2006/061579 | 6/2006 |
| WO | WO 2007/063269 | 6/2007 |
| WO | WO 2007/091631 | 8/2007 |
| WO | WO 2007/116933 | 10/2007 |
| WO | WO 2007/144586 | 12/2007 |

OTHER PUBLICATIONS

International Search Report and Written Opinion issued Mar. 2, 2010, in PCT Application No. PCT/GB2009/051005.
Brach et al., "Improved Synthesis of Metal-free Phthalocyanines", Journal of Heterocyclic Chemistry, 7(1):1403-1405 (Jan. 1, 1970).
P.F. Gordon, et al., Organic Chemistry in Colour, Springer-Verlag Berlin Heidelberg, New York, p. 36 (1983).
The Porphyrin Handbook, vol. 19/Application of Phthalocyanines, Academic Press, p. 138 (2003).

* cited by examiner

*Primary Examiner* — Helene Klemanski
(74) *Attorney, Agent, or Firm* — Morgan, Lewis & Bockius LLP

(57) ABSTRACT

A mixture of azaphthalocyanine compounds of Formula (1) and salts thereof:

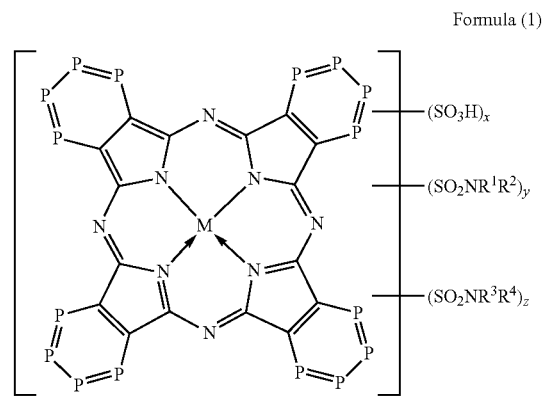

Formula (1)

wherein:
M is 2H, Cu or Ni;
each P is independently CH or N;
$R^1$ is H or optionally substituted $C_{1-4}$alkyl;
$R^2$ is H or optionally substituted $C_{1-8}$alkyl;
$R^3$ is H or optionally substituted hydrocarbyl; and
$R^4$ is optionally substituted hydrocarbyl; or
$R^3$ and $R^4$ together with the nitrogen atom to which they are attached represent an optionally substituted heterocyclic ring system;
x is greater than 0 and less than 4;
y is greater than 0 and less than 4;
z is greater than 0 and less than 4;
the sum of x+y+z is in the range of from 1 to 4 and provided that at least one P is N and that no more than two P groups in any one of the four component rings of the azaphthalocyanine nucleus are N. Also compositions, inks, printing processes, printed materials and ink-jet cartridges.

16 Claims, No Drawings

AZAPHTHALOCYANINES AND THEIR USE IN INK-JET PRINTING

This application is a 371 filing based on PCT/GB2009/051005, filed Aug. 12, 2009, which claims priority to United Kingdom Application No. 0815349.6, filed Aug. 22, 2008, United Kingdom Application No. 0818541.5, filed Oct. 9, 2008, United Kingdom Application No. 0819029.0, filed Oct. 17, 2008, United Kingdom Application No. 0819052.2, filed Oct. 17, 2008, United Kingdom Application No. 0820506.4, filed Nov. 10, 2008, and United Kingdom Application No. 0820504.9, filed Nov. 10, 2008, all of which are hereby incorporated by reference in their entirety.

This invention relates to compounds, compositions and inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate. The set of inks used in this technique typically comprise yellow, magenta, cyan and black inks.

While ink-jet printers have many advantages over other forms of printing and image development there are still technical challenges to be addressed. For example, there are the contradictory requirements of providing ink colorants that are soluble in the ink medium and yet display excellent wet-fastness (i.e. prints do not run or smudge when printed). The inks also need to dry quickly to avoid sheets sticking together after they have been printed, but they should not crust over the tiny nozzles used in the printer. Storage stability is also important to avoid particle formation that could block the printhead nozzles especially since consumers can keep an ink-jet ink cartridge for several months. Furthermore, and especially important with photographic quality reproductions, the resultant images should not bronze or fade rapidly on exposure to light or atmospheric oxidising gases such as ozone.

With the advent of high-resolution digital cameras and ink-jet printers it is becoming increasingly common for consumers to print photographs using an ink-jet printer. This application is particularly demanding since a gamut of colours needs to be accurately and realistically reproduced. This is commonly achieved by applying the different inks to varying degrees. Thus, it is especially important that the shade and chroma of the each applied ink is exactly right so that an image may be optimally reproduced.

Most cyan colorants used in ink-jet printing are based on phthalocyanines and problems of fading and shade change on exposure to light and contact with ozone are particularly acute with dyes of this class.

Thus developing new colorants for ink-jet printing presents a unique challenge in balancing all these conflicting and demanding properties.

The present invention provides a mixture of azaphthalocyanine compounds of Formula (1) and salts thereof:

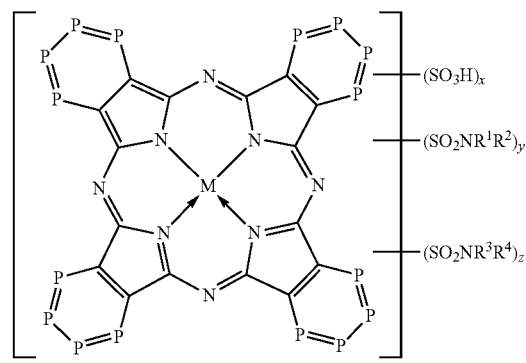

Formula (1)

wherein:
M is 2H, Cu or Ni;
each P is independently CH or N;
$R^1$ is H or optionally substituted $C_{1-4}$alkyl;
$R^2$ is H or optionally substituted $C_{1-8}$alkyl;
$R^3$ is H or optionally substituted hydrocarbyl; and
$R^4$ is optionally substituted hydrocarbyl; or
$R^3$ and $R^4$ together with the nitrogen atom to which they are attached represent an optionally substituted heterocyclic ring system;
x is greater than 0 and less than 4;
y is greater than 0 and less than 4;
z is greater than 0 and less than 4;
the sum of x+y+z is in the range of from 1 to 4 and provided that at least one P is N and that no more than two P groups in any one of the four component rings of the azaphthalocyanine nucleus are N.

M is preferably Cu or Ni and more preferably Cu.

In a first embodiment at least one of $R^1$ and $R^2$ is optionally substituted $C_{1-4}$alkyl carrying at least one water solubilising substituent preferably selected from the group consisting of: —OH, —$SO_3H$, —$CO_2H$ and —$PO_3H_2$. In the first embodiment if one of $R^1$ and $R^2$ is not optionally substituted $C_{1-4}$alkyl carrying at least one water solubilising substituent then it is H or optionally substituted $C_{1-4}$alkyl, preferably H or methyl, especially H.

In a second embodiment $R^1$ and $R^2$ independently are H or methyl and more preferably $R^1$ and $R^2$ are both H.

In a third embodiment at least one of $R^1$ and $R^2$ is optionally substituted $C_{1-4}$alkyl with a phenyl substituent carrying 1 or 2, particularly 2, water solubilising groups, especially water solubilising groups selected from the group consisting of —$SO_3H$, —$CO_2H$ and —$PO_3H_2$ and more especially —$SO_3H$ and —$CO_2H$. In the third embodiment if one of $R^1$ and $R^2$ is not optionally substituted $C_{1-4}$alkyl with a phenyl substituent carrying 1 or 2 water solubilising groups then it is H or optionally substituted $C_{1-4}$alkyl, preferably H or methyl and especially H.

In a fourth preferred embodiment $R^1$ is H or optionally substituted $C_{1-4}$alkyl (preferably H or methyl and especially H) and $R^2$ is $C_{1-8}$alkyl substituted with 2 or more water solubilising groups, especially water solubilising groups selected from the group consisting of —OH, —$SO_3H$, —$CO_2H$, and —$PO_3H_2$. In the fourth preferred embodiment it is especially preferred that $R^2$ is $C_{1-8}$alkyl substituted with 2 or more, preferably 4 or more, —OH groups and optionally other substituents, especially substituents selected from the group consisting of —$SO_3H$, —$CO_2H$ and —$PO_3H_2$.

Preferably $R^3$ is H, optionally substituted alkyl, optionally substituted heterocyclyl or optionally substituted aryl.

More preferably $R^3$ is H or optionally substituted $C_{1-8}$alkyl especially $C_{1-8}$alkyl substituted with 1 or more substituents selected from; water solubilising groups, optionally substituted heteroaryl or optionally substituted phenyl.

It is particularly preferred that $R^3$ is H; $C_{1-4}$alkyl carrying 1 or 2, particularly 2, water solubilising groups selected from the group consisting of —$SO_3H$, —$CO_2H$ and —$PO_3H_2$; $C_{1-4}$alkyl carrying an optionally substituted heteroaryl group (where preferably the heteroaryl group or substituent thereof carries at least one water solubilising group selected from the group consisting of —$SO_3H$, —$CO_2H$ and —$PO_3H_2$; or $C_{1-4}$alkyl carrying an optionally substituted aryl group (where preferably the aryl group or substituent thereof carries at least one water solubilising group selected from the group consisting of —$SO_3H$, —$CO_2H$ and —$PO_3H_2$).

It is especially preferred that $R^3$ is H or methyl, particularly H.

Preferably $R^1$, $R^2$ and $R^3$ are independently H or methyl, particularly H.

Preferably $R^4$ is optionally substituted alkyl, optionally substituted heterocyclyl or optionally substituted aryl.

More preferably $R^4$ is optionally substituted $C_{1-8}$alkyl especially $C_{1-8}$alkyl substituted with 1 or more substituents selected from; water solubilising groups selected from the group consisting of —$SO_3H$, —$CO_2H$ and —$PO_3H_2$; optionally substituted heteroaryl or optionally substituted phenyl.

It is particularly preferred that $R^4$ is $C_{1-4}$alkyl carrying 1 or 2, particularly 2, water solubilising groups selected from the group consisting of —$SO_3H$, —$CO_2H$ and —$PO_3H_2$; $C_{1-4}$alkyl carrying an optionally substituted heteroaryl (where preferably the heteroaryl group or substituent thereof carries at least one water solubilising group selected from the group consisting of —$SO_3H$, —$CO_2H$ and —$PO_3H_2$); or $C_{1-4}$alkyl carrying an optionally substituted phenyl group (where preferably the phenyl group or substituent thereof carries at least one water solubilising group selected from the group consisting of —$SO_3H$, —$CO_2H$ and —$PO_3H_2$).

It is especially preferred that $R^4$ is optionally substituted $C_{1-4}$alkyl carrying an optionally substituted triazinyl (where preferably the triazinyl group or substituent thereof carries at least one water solubilising group selected from the group consisting of —$SO_3H$, —$CO_2H$ and —$PO_3H_2$).

Preferably the optionally substituted triazinyl substituent on $R^4$ when it is optionally substituted $C_{1-4}$alkyl is a group of Formula (2)

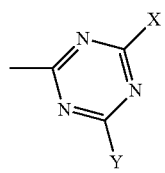

Formula (2)

wherein:
X is selected from the group consisting of —$OR^5$, —$SR^5$, —$NR^5R^6$;
Y is selected from the group consisting of —$OR^7$, —$SR^7$, —$NR^7R^8$;
$R^5$, $R^6$, $R^7$ and $R^8$ are independently H, optionally substituted alkyl, optionally substituted aryl or optionally substituted heterocyclyl provided that at least one of the groups represented by $R^5$, $R^6$, $R^7$ and $R^8$ carries at least one substituent selected from the group consisting of —$SO_3H$, —$CO_2H$ and —$PO_3H_2$.

Preferred groups represented by X and Y include —OH, —$NHCH_3$, —$N(CH_3)_2$, —$NHC_2H_4SO_3H_2$, —$N(CH_3)$ $C_2H_4SO_3H_2$, —$NC_3H_6SO_3H$, —NHdisulfophenyl, —NHsulfophenyl, —NHcarboxyphenyl or —NHdicarboxyphenyl, —NHsulfonaphthyl, —NHdisulfonaphthyl, —NHtrisulfonaphthyl, —NHcarboxyonaphthyl, NHdicarboxyonaphthyl, NHtricarboxyonaphthyl-NHsulfoheterocyclyl, —NHdisulfoheterocyclyl or —NHtrisulfoheterocyclyl.

More preferably the optionally substituted triazinyl substituent on $R^4$ when it is optionally substituted $C_{1-4}$alkyl comprises a group of Formula (3)

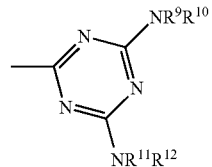

Formula (3)

wherein:
$R^9$ is H or optionally substituted $C_{1-4}$alkyl;
$R^{10}$ is H or optionally substituted $C_{1-4}$alkyl;
$R^{11}$ is H or optionally substituted $C_{1-4}$alkyl;
$R^{12}$ is optionally substituted alkyl, optionally substituted aryl or optionally substituted heterocyclyl carrying at least one substituent selected from the group consisting of —$SO_3H$, —$CO_2H$ and —$PO_3H_2$.

Preferably $R^9$ is H or unsubstituted $C_{1-4}$alkyl, more preferably $R^9$ is H or methyl especially H.

Preferably $R^{10}$ is H or unsubstituted $C_{1-4}$alkyl, more preferably $R^{10}$ is H or methyl especially H.

Preferably $R^{11}$ is H or unsubstituted $C_{1-4}$alkyl, more preferably $R^{11}$ is H or methyl especially H.

In a preferred embodiment $R^9$, $R^{10}$ and $R^{11}$ are all independently either H or methyl, more preferably $R^9$, $R^{10}$ and $R^{11}$ are all H.

Preferably $R^{12}$ is optionally substituted aryl carrying at least one substituent selected from the group consisting of —$SO_3H$, —$CO_2H$ and —$PO_3H_2$. More preferably $R^{12}$ is an aryl group (particularly a phenyl group) carrying 1 to 3, especially 2, —$SO_3H$ or —$CO_2H$ groups.

Preferably the triazinyl groups of Formula (2) or Formula (3) are linked to the alkyl group of $R^4$ by a group of formula

—$NR^{13}$— wherein
$R^{13}$ is H or optionally substituted $C_{1-4}$alkyl.
Preferably $R^{13}$ is H or methyl, more preferably H.
Thus $R^4$ is most preferably a group of Formula (4)

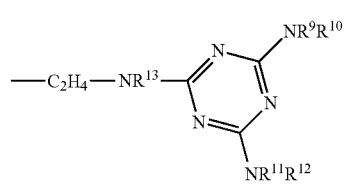

Formula (4)

wherein $R^9$, $R^{10}$, $R^{11}$, $R^{12}$ and are as defined above; and
Preferably x is 0.1 to 3, more preferably 0.2 to 2.0.
Preferably y is 0.1 to 3, more preferably 0.2 to 2.0.

Preferably z is 0.1 to 3.5, more preferably 0.5 to 3, especially 0.8 to 3.0 and more especially 1.0 to 3.

The sum of (x+y+z) is preferably 2 to 4, especially 3.

A skilled person would appreciate that in a mixture of compounds such as this that x, y and z represent average values.

In a preferred embodiment the mixture of azaphthalocyanine compounds, of Formula (1), are of Formula (5) and salts thereof of:

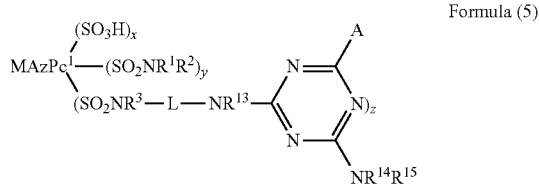

Formula (5)

wherein:

MAzPc$^1$ represents an azaphthalocyanine nucleus of formula

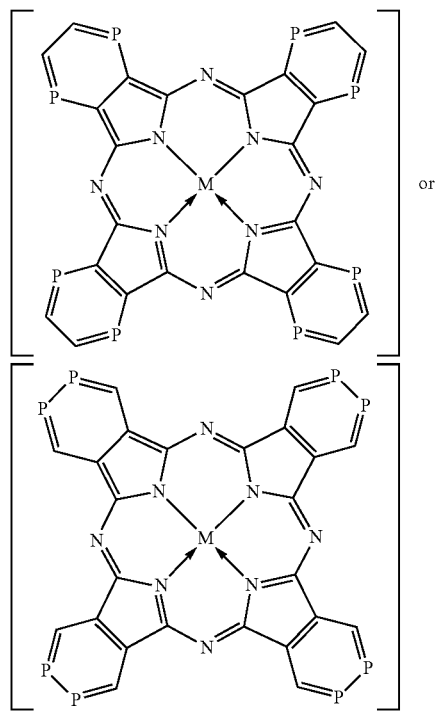

or

M is 2H, Cu or Ni;
each P is independently CH or N;
R$^1$, R$^2$, R$^3$, R$^{13}$, R$^{14}$ and R$^{15}$ are independently H or optionally substituted C$_{1-4}$alkyl;
L is optionally substituted C$_{1-4}$alkylene;
A is selected from the group consisting of —OR$^{16}$, —SR$^{17}$, —NR$^{16}$R$^{17}$;
R$^{16}$ and R$^{17}$ are independently H, optionally substituted alkyl, optionally substituted aryl or optionally substituted heterocyclyl;
x is greater than 0 and less than 4;
y is greater than 0 and less than 4;
z is greater than 0 and less than 4;
the sum of x+y+z is in the range of from 1 to 4; and provided that at least one P is N in any one of the four component rings of the azaphthalocyanine nucleus.

R$^{13}$, R$^{14}$ and R$^{15}$ are independently H or methyl. In one embodiment R$^{13}$, R$^{14}$ and R$^{15}$ are all H and in another embodiment at least one of R$^{14}$ and R$^{15}$ is methyl.

Preferably at least one of the groups represented by R$^{16}$ and R$^{17}$ carries at least one substituent selected from the group consisting of —SO$_3$H, —CO$_2$H and —PO$_3$H$_2$.

A is preferably independently selected from the group consisting of —OH, —NHCH$_3$, —N(CH$_3$)$_2$, —NHC$_2$H$_4$SO$_3$H$_2$, —N(CH$_3$)C$_2$H$_4$SO$_3$H$_2$, —NC$_3$H$_6$SO$_3$H, —NHdisulfophenyl, —NHsulfophenyl, —NHcarboxyphenyl or —NHdicarboxyphenyl, —NHsulfonaphthyl, —NHdisulfonaphthyl, —NHtrisulfonaphthyl, —NHcarboxynaphthyl, NHdicarboxynaphthyl, NHtricarboxynaphthyl-NHsulfoheterocyclyl, —NHdisulfoheterocyclyl or —NHtrisulfoheterocyclyl.

Preferably L is unsubstituted C$_{1-4}$alkylene, especially —C$_2$H$_4$—.

x, y and z and the sum of x+y+z are as preferred above.

Another preferred embodiment provides a mixture of azaphthalocyanine compounds, of Formula (1), of Formula (6) and salts thereof:

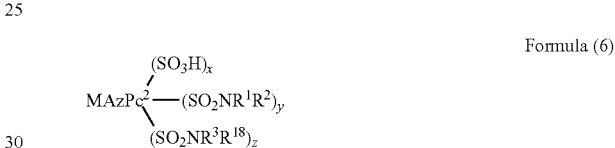

Formula (6)

wherein:

MAzPc$^2$ represents an azaphthalocyanine nucleus of formula

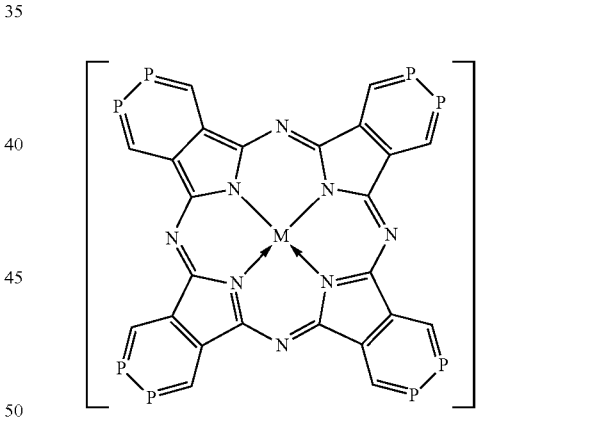

M is 2H, Cu or Ni;
each P is independently CH or N;
R$^1$, R$^2$ and R$^3$ are independently H or optionally substituted C$_{1-4}$alkyl;
R$^{18}$ is optionally substituted C$_{1-8}$alkyl directly carrying at least one optionally substituted phenyl;
x is greater than 0 and less than 4;
y is greater than 0 and less than 4;
z is greater than 0 and less than 4;
the sum of x+y+z is in the range of from 1 to 3; and
provided that at least one P is N in any one of the four component rings of the azaphthalocyanine nucleus.

Preferably R$^{18}$ is C$_{1-4}$alkyl carrying 1 or 2 phenyl substituents, especially 1. More preferably R$^{18}$ is C$_{1-4}$alkyl carrying at least 1 phenyl substituent wherein the phenyl substituent carries 1 or 2 water solubilising groups selected from the group consisting of —SO$_3$H, —CO$_2$H and —PO$_3$H$_2$ (particularly —SO$_3$H and —CO$_2$H).

R$^1$, R$^2$, R$^3$, x, y and z and the sum of x+y+z are as preferred above.

Another preferred embodiment provides a mixture of azaphthalocyanine compounds, of Formula (1), of Formula (7) and salts thereof:

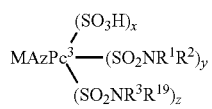

Formula (7)

wherein:

MAzPc$^3$ represents an azaphthalocyanine nucleus of formula

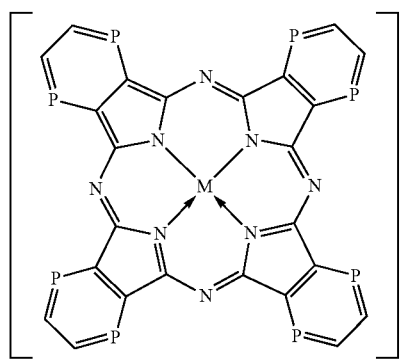

M is 2H, Cu or Ni;
each P is independently CH or N;
R$^1$, R$^2$ and R$^3$ are independently H or optionally substituted C$_{1-4}$alkyl;
R$^{19}$ is optionally substituted C$_{1-8}$alkyl directly carrying at least one substituent selected from the group consisting of —OH, —SO$_3$H, —CO$_2$H, —PO$_3$H$_2$ or optionally substituted phenyl carrying at least one substituent selected from the group consisting of —SO$_3$H, —CO$_2$H and —PO$_3$H$_2$;
x is greater than 0 and less than 4;
y is greater than 0 and less than 4;
z is greater than 0 and less than 4;
the sum of x+y+z is in the range of from 1 to 3; and
provided that at least one P is N in any one of the four component rings of the azaphthalocyanine nucleus.

Preferably R$^{19}$ is C$_{1-4}$alkyl carrying 1 or 2 substituents selected from the group consisting of —OH, —SO$_3$H, —CO$_2$H and —PO$_3$H$_2$ or phenyl carrying 1 or 2 substituent selected from the group consisting of —SO$_3$H and —CO$_2$H.

R$^1$, R$^2$, R$^3$, x, y and z and the sum of x+y+z are as preferred above.

Preferred optional substituents which may be present on any one of L and R$^1$ to R$^{19}$ are independently selected from: optionally substituted alkoxy (preferably C$_{1-4}$-alkoxy), optionally substituted aryl (preferably phenyl), optionally substituted aryloxy (preferably phenoxy), optionally substituted heterocyclyl, polyalkylene oxide (preferably polyethylene oxide or polypropylene oxide), phosphato, nitro, cyano, halo, ureido, hydroxy, ester, —NR$^a$R$^b$, —COR$^a$, —CONR$^a$R$^b$, —NHCOR$^a$, carboxyester, sulfone, and —SO$_2$NR$^a$R$^b$, wherein R$^a$ and R$^b$ are each independently H or optionally substituted alkyl (especially C$_{1-4}$-alkyl). When L and R$^1$ to R$^{19}$ comprise a cyclic group they may also carry an optionally substituted alkyl (especially C$_{1-4}$-alkyl) substituent. Optional substituents for any of the substituents described for L and R$^1$ to R$^{19}$ may be selected from the same list of substituents.

The compounds of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endomethylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide.

Acid or basic groups on the compounds of Formula (1), particularly acid groups, are preferably in the form of a salt. Thus, all Formulae shown herein include the compounds in salt form.

Preferred salts are alkali metal salts, especially lithium, sodium and potassium, ammonium and substituted ammonium salts (including quaternary amines such as ((CH$_3$)$_4$N$^+$) and mixtures thereof. Especially preferred are salts with sodium, lithium, ammonia and volatile amines, more especially sodium salts. Compounds of Formula (1) may be converted into a salt using known techniques.

The compounds of Formula (1) may exist in tautomeric forms other than those shown in this specification. These tautomers are included within the scope of the present invention.

The mixtures of compounds of Formula (1) may be prepared by any method known in the art, and particularly by any method which comprises cyclisation of a phthalic acid, phthalonitrile, iminoisoindoline, phthalic anhydride, phthalimide or phthalamide (or analogue thereof) with a nitrogen heteroaryl dicyano or dicarboxylic acid such as (for example) pyridine-2,3-dicarboxylic acid, pyridine-3,4-dicarboxylic acid, 2,3-dicyanopyridine or 2,3-dicyanopyrazine, in the presence of a suitable nitrogen source (if required), a metal salt, such as CuCl$_2$, (if required) and a base such as 1,8-diazabicyclo[5.4.0]undec-7-ene (DBU).

The azaphthalocyanine so formed may then be chlorosulfonated by reacting with, for example, chlorosulfonic acid and optionally a chlorinating agent (e.g. POCl$_3$, PCl$_5$ or thionyl chloride). The sulfonyl chloride groups so formed are reacted with compounds of formula HNR$^1$R$^2$ and HNR$^3$R$^4$ wherein R$^1$, R$^2$, R$^3$ and R$^4$ are as hereinbefore defined. This reaction is preferably performed in water at a pH above 7. Typically the reaction is performed at a temperature of 30 to 70° C. and is usually complete in less than 24 hours. The compounds of formula $HNR^1R^2$ and $HNR^3R^4$ may be used as a mixture or added sequentially.

Many of the compounds of formula $HNR^1R^2$ and $HNR^3R^4$ are commercially available, for example for ammonia or taurine, others may be made easily by a skilled person using methods which are well known in the art.

The ratio of sulfo to different sulfonamide substituents may be varied by varying the nature and amount of chlorinating agent used, the relative amounts of compounds of formula $HNR^1R^2$ and $HNR^3R^4$ used and the reaction conditions in both reactions.

If it is required that the substituents represented by x, y and z are only in the β-position then the cyclisation should be carried using one or more component carrying a sulfonic acid group so positioned that post reaction it will be exclusively in the β-position such as, for example, 4-sulfophthalic acid. The ring carrying the β-sulfonic acid groups may then be reacted with a chlorinating agent and then with compounds of formula $HNR^1R^2$ and $HNR^3R^4$ as described above.

A skilled person will appreciate that the product of these reactions will be a disperse mixture and so the values of x, y and z will represent an average of the groups present in the mixture.

The mixtures of compounds of Formula (1) will also comprise various isomers varying depending on the relative positions of the component rings containing 0, 1 or 2 N atoms, and the nature and position of any substituents on these component rings.

The compounds of Formula (1) have attractive, strong shades and are valuable colorants for use in the preparation of ink-jet printing inks. They benefit from a good balance of solubility, storage stability and fastness to water, ozone and light. In particular they display excellent wet fastness and ozone fastness.

The present invention also provides a mixture of dyes comprising azaphthalocyanine compounds of Formulae (1), (5), (6) and (7) and salts thereof obtainable by a process which comprises a cyclisation step wherein phthalic acid (or a suitable analogue thereof) is mixed with a nitrogen heteroaryl dycyano or dicarboxylic acid.

It will also be appreciated by the skilled person that the mixture of dyes of the present invention will also encompass an azaphthalocyanine compound of Formulae (1), (5), (6) and (7) and salts thereof and mixtures of dyes comprising an azaphthalocyanine compound of Formulae (1), (5), (6) and (7) and salts thereof.

According to a second aspect of the present invention there is provided a composition comprising a mixture of azaphthalocyanine compounds and salts thereof as described, and preferred, in the first aspect of the invention and a liquid medium.

Preferred compositions according to the second aspect of the invention comprise:
(a) from 0.01 to 30 parts of a mixture of compounds of Formula (1) according to the first aspect of the invention; and
(b) from 70 to 99.99 parts of a liquid medium;
wherein all parts are by weight.

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 80 to 99.9, more preferably from 85 to 99.5 and especially from 95 to 99 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethylene glycol, thiodiglycol, diethylene glycol and triethylene glycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP-A-425,150.

When the liquid medium comprises organic solvent free from water, (i.e. less than 1% water by weight) the solvent preferably has a boiling point of from 30 to 200° C., more preferably of from 40 to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the mixture of phthalocyanine dyes in the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; and C.I. Acid Yellow 23.

It is preferred that the composition according to the invention is ink suitable for use in an ink-jet printer. Ink suitable for use in an ink-jet printer is ink which is able to repeatedly fire through an ink-jet printing head without causing blockage of the fine nozzles. To do this the ink must be particle free, stable (i.e. not precipitate on storage), free from corrosive elements (e.g. chloride) and have a viscosity which allows for good droplet formation at the print head.

Ink suitable for use in an ink-jet printer preferably has a viscosity of less than 20 cP, more preferably less than 10 cP, especially less than 5 cP, at 25° C.

Ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colorant or additive incorporated in the ink).

Preferably ink suitable for use in an ink-jet printer has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

Preferably ink suitable for use in an ink-jet printer contains less than 500 ppm, more preferably less than 250 ppm, especially less than 100 ppm, more especially less than 10 ppm in total of halide ions.

A third aspect of the invention provides a process for forming an image on a substrate comprising applying a composition, preferably ink suitable for use in an ink-jet printer, according to the second aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred. Photographic quality papers are especially preferred.

A fourth aspect of the present invention provides a material preferably paper, plastic, a textile, metal or glass, more preferably paper, an overhead projector slide or a textile material, especially paper more especially plain, coated or treated papers printed with a mixture of compounds as described in the first aspect of the invention, a composition according to the second aspect of the invention or by means of a process according to the third aspect of the invention.

It is especially preferred that the printed material of the fourth aspect of the invention is a print on a photographic quality paper printed using a process according to the third aspect of the invention.

A fifth aspect of the present invention provides an ink-jet printer cartridge comprising a chamber and a composition, preferably ink suitable for use in an ink-jet printer, wherein the composition is in the chamber and the composition is as defined and preferred in the second aspect of the present invention. The cartridge may contain a high concentration ink and a low concentration ink, as described in the second aspect of the invention, in different chambers.

The invention is further illustrated by the following Examples in which all parts and percentages are by weight unless otherwise stated.

In all the Examples which disclose a mixture of dyes the formula which is given is a generic formula. Thus, if one nitrogen containing ring intermediate is reacted with three nitrogen free ring intermediates then the azaphthalocyanine is shown with only one of the four component rings having a nitrogen. This is of course not the true situation since the product of the cyclisation of these component rings will be polydisperse. Thus, the mixture of dyes formed in the Examples will contain a variety of different species of ring some free of nitrogen containing component rings and some containing two or three nitrogen containing component rings. Also in all the Examples which disclose a mixture of dyes, x+y+z is 3. The ratio of x to y to z being determined by the relative concentration of the amines/ammonia which react with the sulfonyl chloride intermediate and the reaction conditions.

EXAMPLE 1

Preparation of a Mixture of Dyes of Formula

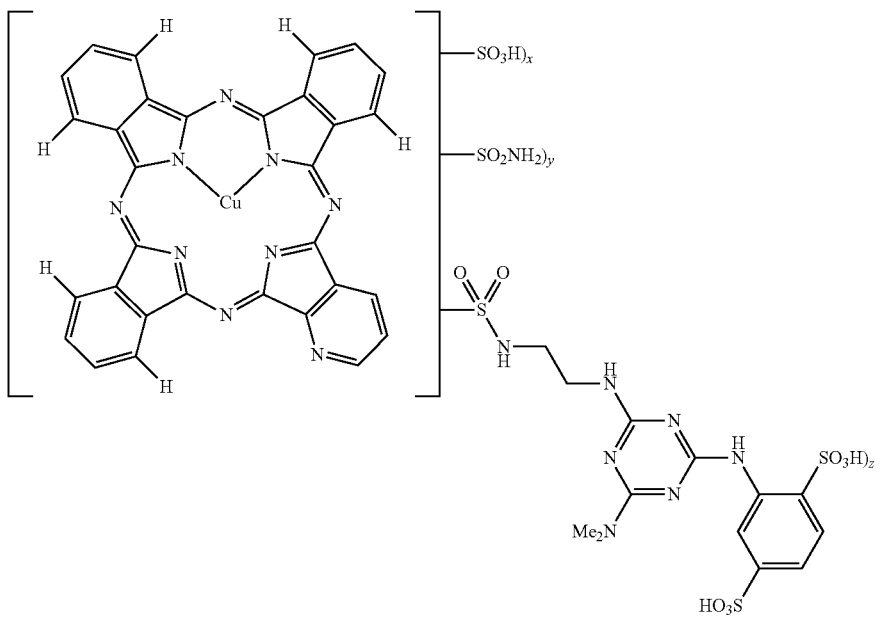

Stage 1a
Preparation of

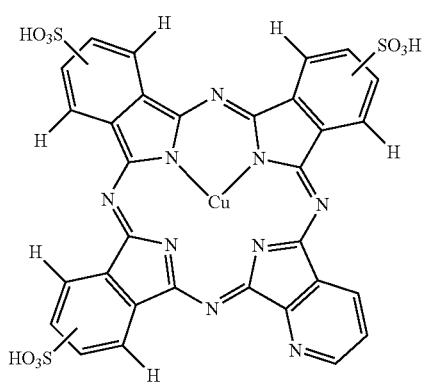

A mixture of the potassium salt of 4-sulfophthalic acid (36 g), pyridine-2,3-dicarboxylic acid (7 g), copper(II) chloride (5.65 g), urea (96 g), ammonium molybdate (1 g) and 1,8-diazabicyclo[5.4.0]undec-7-ene (6 g) were stirred under nitrogen and heated to 160° C. for 1 hour and then at 180° C. for ½ hour. Finally the melt was stirred at 210° C. for ½ hour. The reaction was cooled to 100° C. and the solid extracted with water. The aqueous extracts were stirred at 70-80° C. and filtered and the filtrate was salted with sodium chloride (15%). The precipitated solid was filtered, washed with 15% brine and then 10% brine. The damp solid was dissolved in water, dialysed and dried to give the product (28.6 g).

Stage 1b
Preparation of

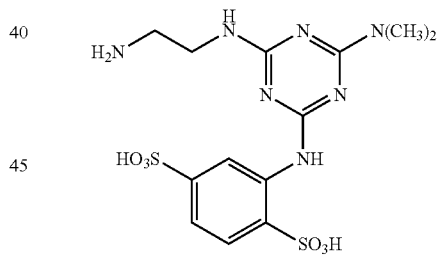

2,5-Disulfoaniline (13.8 g) was dissolved in water at pH 7 9 adjusting with aqueous sodium hydroxide) and added dropwise to a slurry of cyanuric chloride (9.28 g) in water (200 ml) and calsolene oil (few drops) at pH 5 to 6 and 5° C. The pH of the reaction was maintained by the addition of dilute sodium hydroxide. After 2 hours the pH was raised to 7 and the reaction was left at 25° C. for 0.5 hours and then filtered. Dimethylamine (40% strength) (6.3 ml) was added to the filtrate, the pH was raised, with dilute sodium hydroxide, to pH 8.5 to 9 and the reaction was help at 25° C. for 2 hours. The reaction was then stirred for 1 hour at 60° C. and then for 1 hour 80° C. maintaining the pH at pH 9-10. The reaction was allowed to cool to room temperature overnight. The next day ethylene diamine (33 ml) was added and the reaction was heated at 80° C. for 2 hours. The resultant product was isolated by concentrating the reaction mixture to low volume (200 ml), adding salt (20 g) and lowering the pH to 1 with concentrated hydrochloric acid. The precipitated solid was filtered and washed with 20% sodium chloride solution (50 ml). The precipitate was stirred in a mixture of methanol (170 ml) and water (9 ml) at room temperature and then at 60° C. for 1 hour, allowed to cool and filtered, washed with methanol (25 ml) and dried to give the required product as a white solid (18.5 g).

Stage 1c
Preparation of

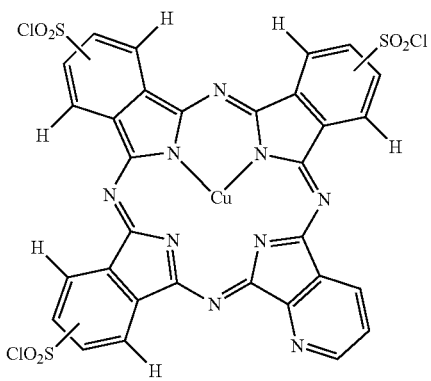

Phosphorous oxychloride (11.9 g) was added drop-wise to chlorosulfonic acid (120 g) over 5 to 10 minutes while keeping the temperature below 35° C. When all the phosphorous oxychloride had been added the product from stage 1a (19.4 g) was added portion-wise while keeping the reaction temperature below 60° C. The reaction mixture was then stirred at 50-55° C. for 10 minutes. The temperature of the reaction mixture was then increased to 130° C. over 20 minutes, and the reaction mixture was held at this temperature for 6 hours. The reaction was allowed to cool and stirred overnight at room temperature. The reaction mixture was added to ice (600 g) and the resultant precipitate filtered and washed with cold 3% brine to give a damp paste (72.1 g).

Stage 1d
Preparation of the Title Mixture of Dyes

The damp filter cake from stage 1c (36.05 g) was slurried in water (100 ml) and added to a mixture of a solution of the amine from stage 1b (5.78 g) in water (50 ml) at pH8.5 and ammonium chloride (3.2 g) in water (25 ml), at 0-10° C. The resultant mixture was stirred at 0-10° C. maintaining the pH at 9-9.5 by the addition of 2M NaOH. The reaction mixture was stirred at 50-55° C. overnight whilst maintaining the pH at 9.5-9.7 with 2M NaOH. The next day the reaction mixture was heated to 80° C. at pH 12 for 2 hours and then cooled and filtered and the filtrate adjusted to pH 8.5 with HCl and salted with sodium chloride to precipitate the product. The precipitated solid was filtered, re-dissolved in deionised water (400 ml), salted, and the pH was adjusted to 5. The precipitated solid was filtered, solid slurried in a mixture of methanol/water (400 ml/20 ml), filtered and the resultant solid dissolved in deionised water (200 ml), dialysed, filtered and then dried at 60-70° C. to give the product (8.8 g). (x=1.1, y=1.6, z=0.4)

EXAMPLE 2

Prepared as in Example 1 except that in stage 1d, 8.3 g of the amine from stage 1b and 1.6 g of ammonium chloride were used to give the product (9 g). (x=1.1, y=1.5, z=0.6)

EXAMPLE 3

Prepared as in Example 1 except that in stage 1d, 2.84 g of the amine from stage 1b and 3.2 g of ammonium chloride were used to give the product (8.1 g).

EXAMPLE 4

Prepared as in Example 1 except that in stage 1d 4.26 g of the amine from stage 1b and 3.2 g of ammonium chloride were used to give the product (8.15 g).

EXAMPLE 5

Preparation of a Mixture of Dyes of Formula

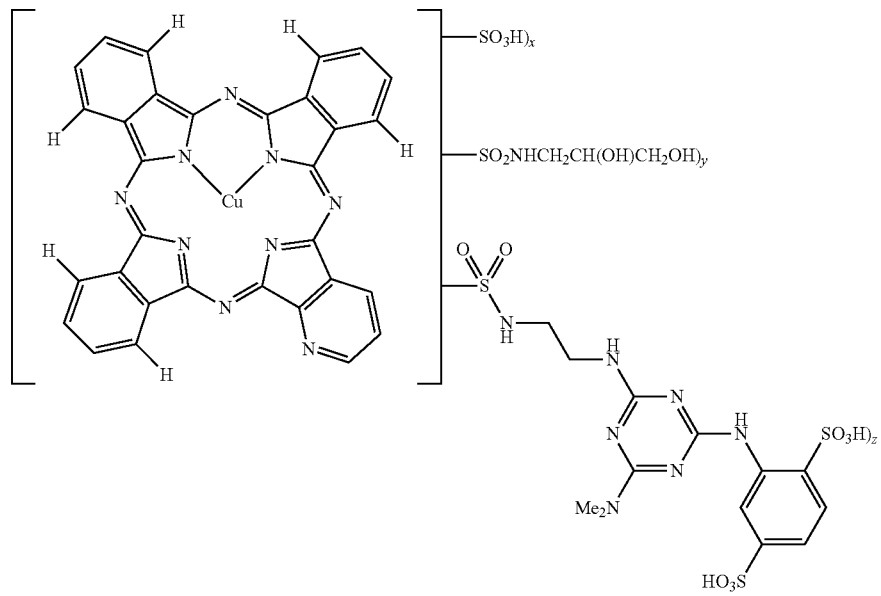

Prepared as in Example 1 except that in stage 1d, 6.2 g of the amine from stage 1b and 1g of 3-aminopropan-1,2-diol (instead of ammonium chloride) were used to give the product (11.5 g).

EXAMPLE 6

Prepared as in Example 5 except that in stage 1d, 8.52 g of the amine from stage 1b and 1.82 g of 3-aminopropan-1,2-diol were used to give the product (9.4 g).

EXAMPLE 7

Prepared as in Example 5 except that in stage 1d, 6.2 g of the amine from stage 1b and 1.82 g of 3-aminopropan-1,2-diol instead of ammonium chloride were used to give the product (11.4 g).

EXAMPLE 8

Prepared as in Example 5 except that in stage 1d, 6.2 g of the amine from stage 1b and 2.73 g of 3-aminopropan-1,2-diol were used to give the product (11 g).

EXAMPLE 9

Preparation of a Mixture of Dyes of Formula

Prepared as in Example 1 except that in stage 1d, 6.2 g of the amine from stage 1b and 0.67 g of 2-aminoethanol (instead of ammonium chloride) were used to give the product (10.2 g).

EXAMPLE 10

Prepared as in Example 9 except that in stage 1d, 8.52 g of the amine from stage 1b and 1.32 g of 2-aminoethanol were used to give the product (8.9 g).

EXAMPLE 11

Prepared as in Example 9 except that in stage 1d, 6.2 g of the amine from stage 1b and 1.22 g of 2-aminoethanol were used to give the product (9.1 g).

EXAMPLE 12

Prepared as in Example 9 except that in stage 1d, 6.2 g of the amine from stage 1b and 1.83 g of 2-aminoethanol were used to give the product (9.2 g).

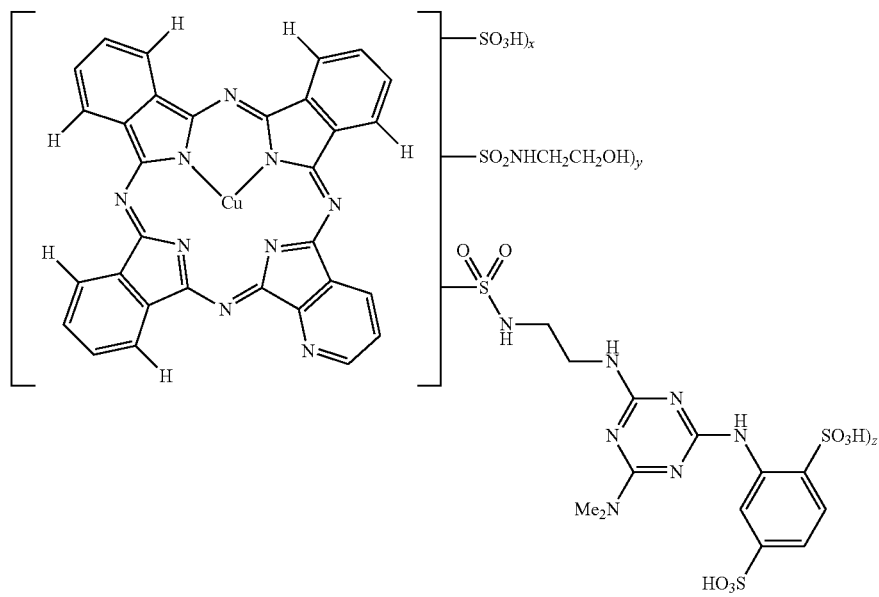

EXAMPLE 13

Preparation of a Mixture of Dyes of Formula

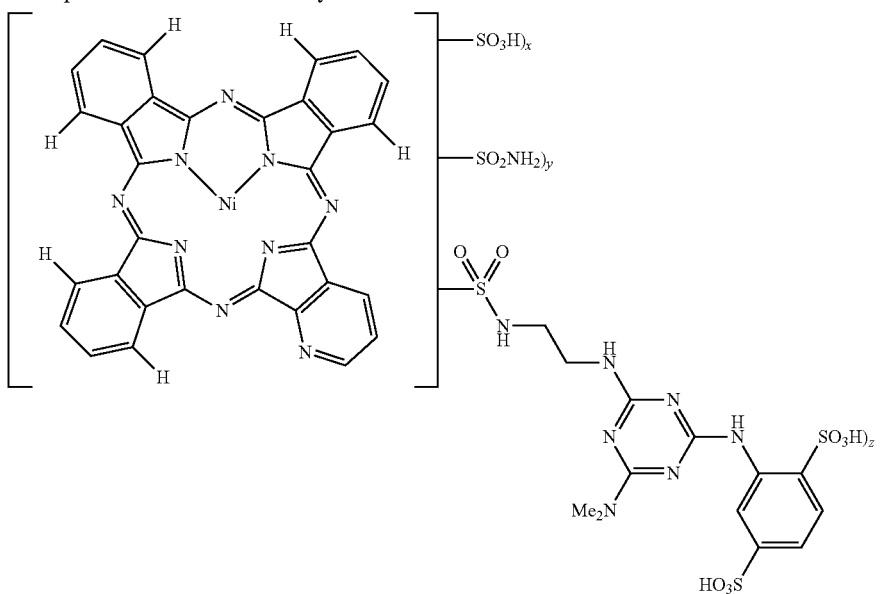

Prepared as Example 1 except that in stage 1a nickel II chloride was used instead of copper II chloride and in stage 1d, 6.2 g of the amine from stage 1b (6.2 g) and ammonium chloride (3.21 g) were used to give the product (6.4 g).

EXAMPLE 14

Prepared as Example 13 except that in stage 1d 8.5 g of the amine from stage 1b and ammonium chloride 1.6 g. were used to give the product (7.3 g).

EXAMPLE 15

Preparation of a Mixture of Dyes of Formula

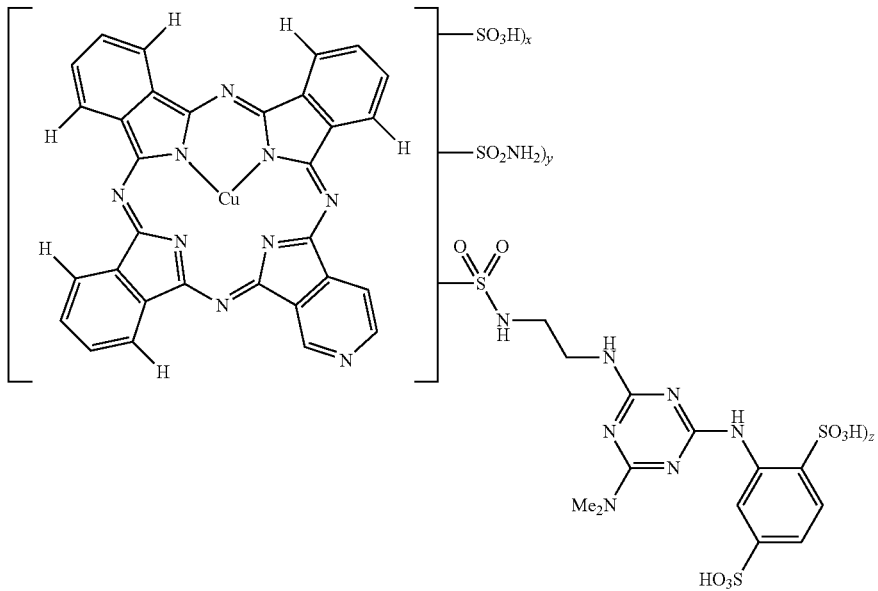

Stage 15a

Preparation of

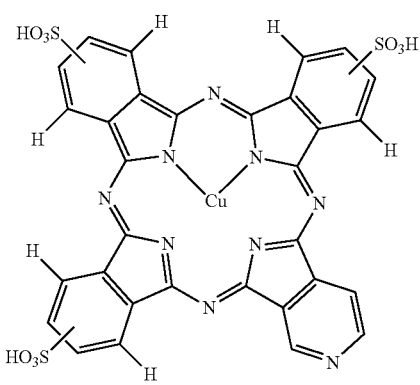

A mixture of the potassium salt of 4-sulfophthalic acid (49.5 g), pyridine-3,4-dicarboxylic acid (8.35 g), copper(II) chloride (7.1 g), urea (120 g), ammonium molybdate (1.2 g) and 1,8-diazabicyclo[5.4.0]undec-7-ene (7.5 g) were stirred under nitrogen and heated to 150° C. for ½ hour. The melt was then stirred at 200-210° C. for 30 minutes. The reaction mixture was cooled to <120° C. and the solid was extracted with water. The aqueous extracts were stirred at 70-80° C. and filtered and the filtrate was then salted with sodium chloride (10%). The precipitated solid was filtered and washed with 10% brine. The resultant damp solid was dissolved in water, dialysed and dried to give the product (36 g). (Elemental analysis of sulfonic acid per molecule=2.8)

Stage 15b

Preparation of

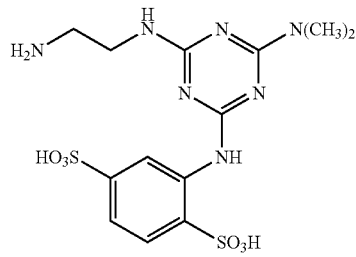 [SMILES: CN(C)c1nc(NCCN)nc(Nc2cc(S(=O)(=O)O)ccc2S(=O)(=O)O)n1]

Prepared as in Example 1, stage 1b.

Stage 15c
Preparation of

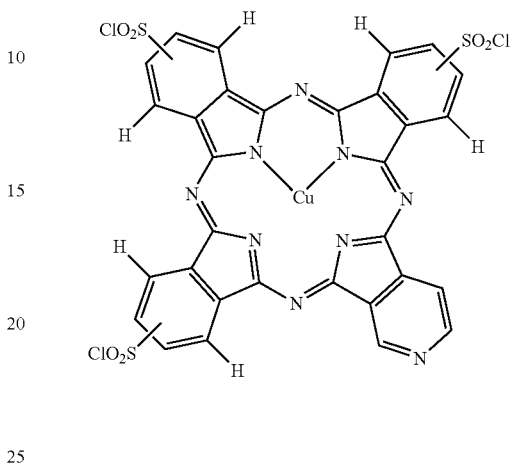

Phosphorous oxychloride (12.4 g) was added drop-wise to chlorosulfonic acid (120 g) over 5 to 10 minutes while keeping the temperature below 35° C. When all the phosphorous oxychloride had been added the product from stage 1a (19.1 g) was added portion-wise while keeping the reaction temperature below 60° C. The reaction mixture was then stirred at 45-50° C. for 10 minutes. The temperature of the reaction mixture was then increased to 130° C. over 20 minutes, and the reaction mixture held at this temperature for 6 hours. The reaction was allowed to cool to room temperature and then added to ice (600 g) and the resultant precipitate was filtered and washed with cold 5% brine to give a damp paste (72 g).

Stage 15d
Preparation of the Title Mixture of Dyes

The damp filter cake from stage 1c (36 g) was slurried in water (100 ml) and added to a mixture of a solution of the amine from stage 1b (5.78 g) in water (50 ml) at pH 8.5 and ammonium chloride (3.2 g) in water (25 ml), at 0-10° C. The resultant mixture was stirred at 5-10° C. keeping the pH at 9 by the addition 2M NaOH. The reaction mixture was then stirred at 50-55° C. overnight whilst maintaining the pH at 9.5 with 2M NaOH. The next day the reaction mixture was heated to 80-85° C. at pH 12 for 2 hours and then cooled and filtered and filtrate being adjusted to pH 8.5 with HCl and salted with sodium chloride to precipitate the product. The precipitated solid was filtered, re-dissolved in deionised water (300 ml), salted, and the pH adjusted to 4.8. The precipitated solid was filtered, solid slurried in a mixture of methanol/water (400 ml/20 ml), filtered and the solid dissolved in deionised water (200 ml), dialysed, filtered and then dried at 60-70° C. to give the product (6.8 g).

EXAMPLE 16

Prepared as in Example 15 except that in stage 15d, 8.3 g of the amine from stage 15b and 1.6 g ammonium chloride were used to give product (7.9 g).

EXAMPLE 17

Preparation of a Mixture of Dyes of Formula

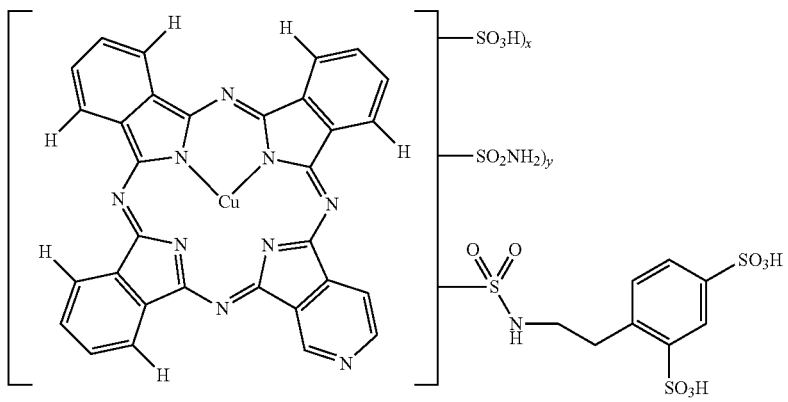

Stage 17a
Preparation of

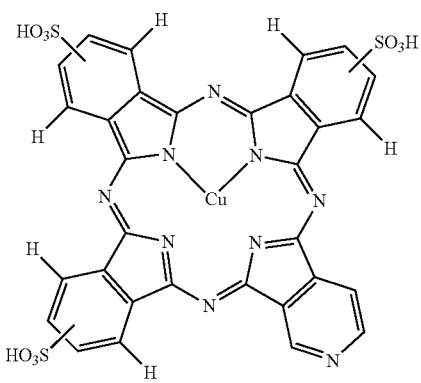

Prepared as described in Example 15, stage 15a.
Stage 17b
Preparation of

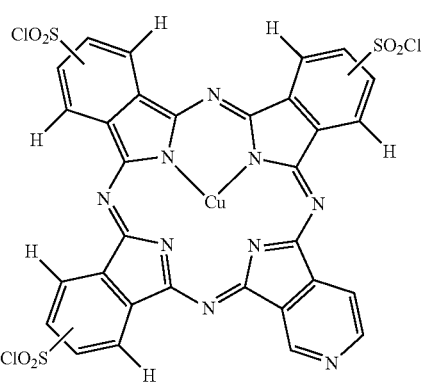

Prepared as described in Example 15, stage 15c.
Stage 17c
Preparation of 2'-aminoethylbenzene 2,4 disulfonic acid Phenylethylamine (24.2 g) was added drop-wise to 30% oleum (125 ml) at <60° C. (ice cooling). The mixture was then heated at 100-110° C. for 4 hours, cooled and drowned into ice/water (1200 cc) at 10° C. Calcium hydroxide (170 g) was added and the solution stirred for 30 minutes. The precipitate was filtered off and the filtrate was evaporated to dryness. The resultant product was washed with ethanol and dried to give title product as an off white solid (60 g, 80% strength).
Stage 17d
Preparation of the Title Mixture of Dyes The damp filter cake from stage 1c (36 g) was slurried in water (200 ml) and added to a mixture of a solution of 2'-aminoethylbenzene 2,4 disulfonic acid (3.95 g) in water (50 ml) at pH 8.5 and ammonium chloride (3.2 g) in water (25 ml), at 0-10° C. The resultant mixture was stirred at 5-10° C. keeping the pH at 9 by the addition 2M NaOH. The reaction mixture was then stirred at 50-55° C. overnight whilst maintaining the pH at 9.5 with 2M NaOH. The next day the reaction mixture was heated to 80-85° C. at pH 12 for 2 hours and then cooled. The reaction mixture was then dialysed to low conductivity, filtered and then dried to give the product (10 g).

EXAMPLE 18

Prepared as in Example 17 except that in stage 17d 5.9 g of 2'-aminoethylbenzene 2,4-disulfonic acid and 1.6 g of ammonium chloride were used to give 7.6 g of product.

EXAMPLE 19

Preparation of a Mixture of Dyes of Formula

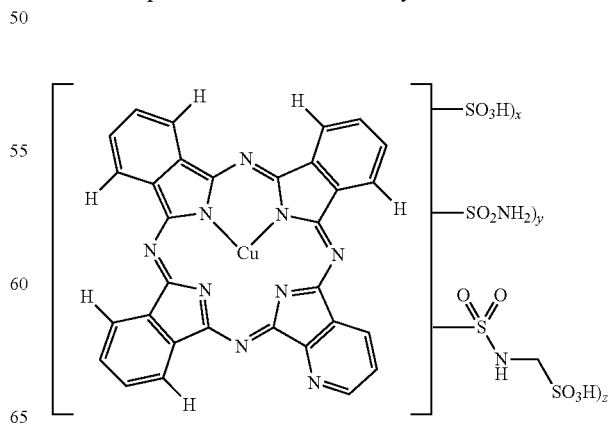

Stage 19a
Preparation of

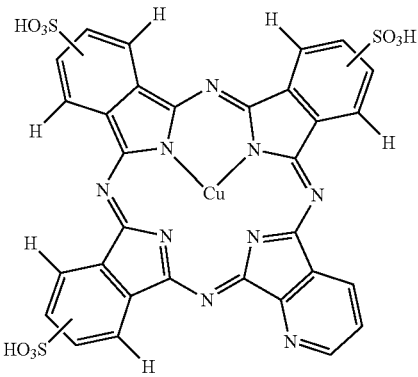

Prepared as described in Example 1, stage 1a.
Stage 19b
Preparation of

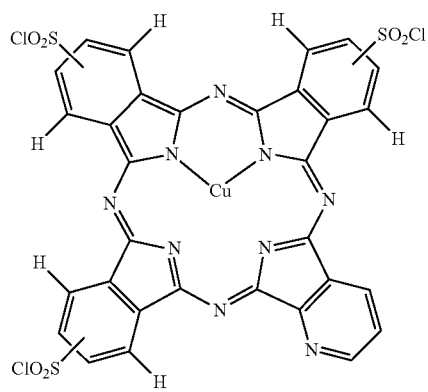

Phosphorous oxychloride (15.68 g) was added drop-wise to chlorosulfonic acid (120 g) over 5 to 10 minutes while keeping the temperature below 35° C. When all the phosphorous oxychloride had been added the product from stage 1a (19.4 g) was added portion-wise while keeping the reaction temperature below 60° C. The reaction mixture was then stirred at 50-55° C. for 10 minutes. The temperature of the reaction mixture was then increased to 130° C. over 20 minutes, and the reaction mixture was held at this temperature for 6 hours. The reaction was allowed to cool and stirred overnight at room temperature. The reaction mixture was added to ice (600 g) and the resultant precipitate filtered and washed with cold 3% brine to give a damp paste.
Stage 19c
Preparation of the Title Mixture of Dyes
Half the damp filter cake from stage 19b was slurried in water (100 ml) and added to a mixture of a solution of taurine (2.5 g) in water (50 ml) at pH8.5 and ammonium chloride (1.07 g) in water (25 ml), at 0-10° C. The resultant mixture was stirred at 5 to 10° C. keeping the pH at 9 by the addition 2M NaOH. The reaction mixture was then stirred at 50-55° C. overnight whilst maintaining the pH at 9.5 to 9.7 with 2M NaOH. The next day the reaction mixture was heated to 80° C. at pH 12 for 2 hours and then cooled and filtered. The filtrate was adjusted to pH 8.5 with HCl and then salted with sodium chloride and pH lowered to 1 to precipitate the product. The precipitated solid was filtered, solid slurried in a mixture of methanol/water (400 ml/20 ml), filtered and the solid dissolved in deionised water (200 ml), dialysed, to low conductivity, filtered and then dried at 60-70° C. to give the product (8 g).

EXAMPLE 20

Prepared as in Example 1 except that in stage 1c, 5 g of taurine and 0.54 g of ammonium chloride were used to give the product (10 g).

EXAMPLE 21

Prepared as in Example 1 except that in stage 1c, 12.5 g of taurine and 0.54 g of ammonium chloride were used to give the product (8.3 g).

EXAMPLE 22

Prepared as in Example 1 except that in stage 1c, 5 g of taurine and 0.27 g of ammonium chloride were used to give the product (6.7 g).

EXAMPLE 23

Preparation of a Mixture of Dyes of Formula

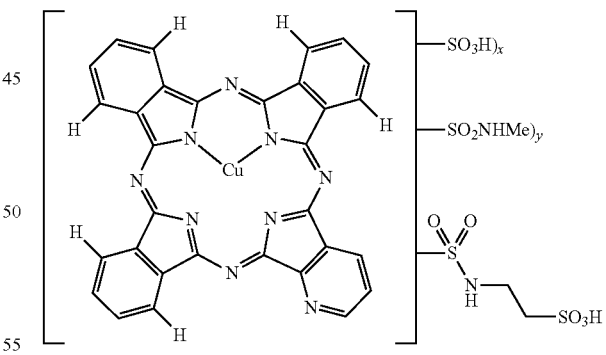

Prepared as in Example 1 except that in stage 1c, 2.5 g of taurine and 0.32 g 40% methylamine solution were used instead of the amine from step 1b and ammonium chloride to give the product (5.7 g).

EXAMPLE 24

Prepared as in Example 23 except that in stage 1c, 3.75 g of taurine and 0.32 g 40% methylamine solution were used to give the product (5.6 g).

EXAMPLE 25

Preparation of a Mixture of Dyes of Formula

[Structure: Copper phthalocyanine-type macrocycle with pyridine ring, substituted with –SO₃H)ₓ, –SO₂NMe₂)ᵧ, and –SO₂NH-CH₂CH₂-SO₃H groups]

Prepared as in Example 1 except that in stage 1c, 2.5 g of taurine and 0.45 g 40% dimethylamine solution were used instead of the amine from step 1b and ammonium chloride to give the product (10 g).

EXAMPLE 26

Prepared as in Example 25 except that in stage 1c, 3.7 g of taurine and 0.45 g 40% dimethylamine solution were used to give the product (8.8 g).

EXAMPLE 27

Preparation of a Mixture of Dyes of Formula

[Structure: Copper phthalocyanine-type macrocycle with pyridine ring, substituted with –SO₃H)ₓ, –SO₂NHCH₂CH(OH)CH₂OH)ᵧ, and –SO₂NH-CH₂CH₂-SO₃H groups]

Prepared as in Example 1 except that in stage 1c, 2.5 g of taurine and 0.91 g 3-aminopropan-1,2-diol were used to give the product (9.1 g).

EXAMPLE 28

Prepared as in Example 27 except that in stage 1c, 3.75 g of taurine and 0.91 g 3-aminopropan-1,2-diol were used instead of the amine from step 1b and ammonium chloride to give the product (9.2 g).

EXAMPLE 29

Preparation of a Mixture of Dyes of Formula

[Structure: Copper phthalocyanine-type macrocycle with pyridine ring, substituted with –SO₃H)ₓ, –SO₂NH₂)ᵧ, and –SO₂NH-CH₂CH₂-(disulfonated phenyl)–SO₃H)_z groups]

Stage 29a
Preparation of 2'-aminoethylbenzene 2,4 disulfonic acid

Phenylethylamine (24.2 g) was added drop-wise to 30% oleum (125 ml) at <60° C. (ice cooling). The mixture was then heated at 100-110° C. for 4 hours, cooled and drowned into ice/water (1200 cc) at 10° C. Calcium hydroxide (170 g) was added and the solution stirred for 30 minutes. Precipitates were filtered off and the filtrate was evaporated to dryness. The resultant product was washed with ethanol and dried to give title product as an off white solid (60 g, 80% strength).

Stage 29b
Preparation of the Title Product

The title product was prepared using the protocol of Example 1 except that in stage 1c 3.95 g of the amine prepared in stage 29a and 3.2 g of ammonium chloride were used to give 7.5 g of product.

EXAMPLE 30

The product was prepared using the protocol of Example 29 except that in stage 29b, 5.93 g of the amine prepared in stage 29a and 1.6 g of ammonium chloride were used to give 8 g of product.

EXAMPLE 31

Preparation of a Mixture of Dyes of Formula

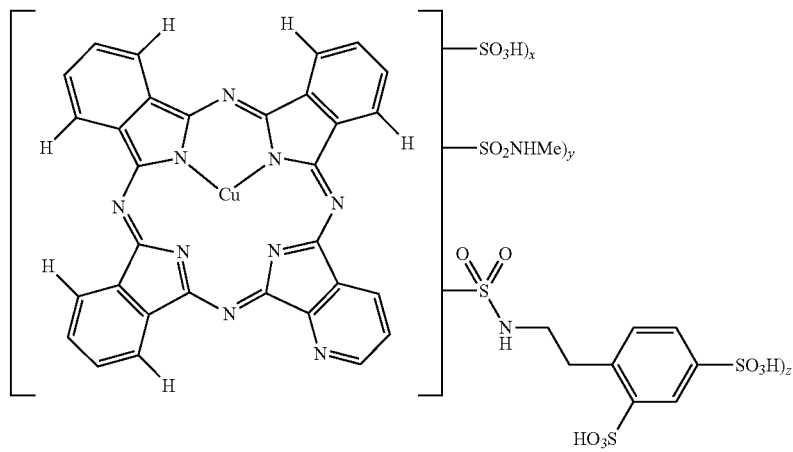

The product was prepared using the protocol of Example 29 except that in stage 29b, 6.9 g of the amine prepared in stage 29a and 0.31 g 40% methylamine solution (instead of ammonium chloride) were used to give 10 g of product.

EXAMPLE 32

The product was prepared using the protocol of Example 32 except that in stage 29b, 3.48 g of the amine prepared in stage 29a and 0.62 g 40% methylamine solution were used to give 8.9 g of product.

EXAMPLE 33

Preparation of a Mixture of Dyes of Formula

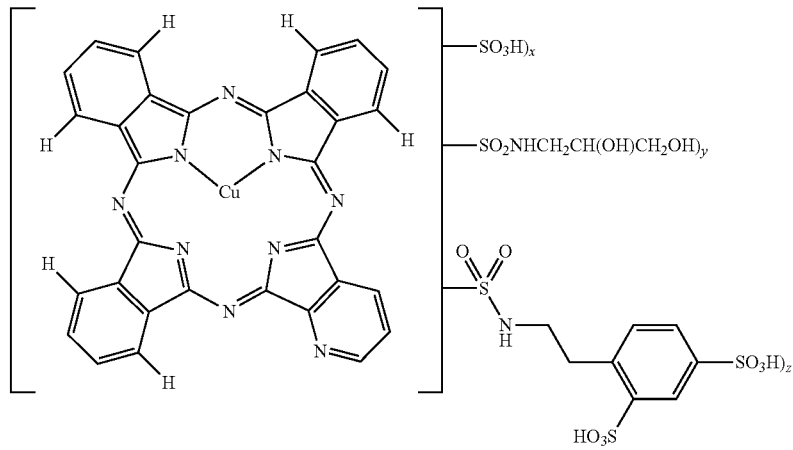

The product was prepared using the protocol of Example 29 except that in stage 29b, 4.3 g of the amine prepared in stage 29a and 0.91 g 3-aminopropan-1,2-diol (instead of ammonium chloride) were used to give 8.1 g of product.

EXAMPLE 34

The product was prepared using the protocol of Example 23 except that in stage 29b, 6.32 g of the amine prepared in stage 29a and 0.91 g 3-aminopropan-1,2-diol were used to give 10 g of product.

EXAMPLE 35

Example 35 is the lithium salt of the compound prepared in Example 19. The compound was prepared from the corresponding sodium salt by ion-exchange chromatography on Amberlite® IR120H.

EXAMPLE 36

Preparation of Inks

Inks were prepared by dissolving 3.5 g of the dyes of Examples 3, 8, 27 and 35 in 96.5 g of a liquid medium comprising:

| | |
|---|---|
| Diethylene glycol | 7% |
| Ethylene glycol | 7% |
| 2-Pyrollidone | 7% |
| Surfynol ™ 465 | 1% |
| Tris buffer | 0.2% |
| Water | 77.8% (all % by weight) | and adjusting the pH of the ink to 8-8.5 using sodium hydroxide (for Examples 3, 8 and 27) or lithium hydroxide (for Example 35).

Surfynol® 465 is a surfactant from Air Products.

To avoid any doubt these inks were designated Ink 3, Ink 8, Ink 27 and Ink 35 with each ink containing the compound of the corresponding Example.

EXAMPLE 37

Ink-Jet Printing

Ink prepared as described above was filtered through a 0.45 micron nylon filter and then incorporated into empty print cartridges using a syringe.

This ink was printed on to the following ink-jet media at 50% depth;
Epson Ultra Premium Glossy Photo Paper (SEC PM); and
Canon Premium PR101 Photo Paper (PR101)
HP Advanced Photo Paper (HPP)

The prints were tested for ozone fastness by exposure to 5 ppm ozone at 25° C., 50% relative humidity for 24 hours. Fastness of the printed ink to ozone was judged by the difference in the optical density before and after exposure to ozone.

Light-fastness of the printed image is assessed by fading the printed image in an Atlas® Ci5000 Weatherometer for 100 hours and then measuring the change in the optical density.

Optical density measurements were performed using a Gretag® spectrolino spectrophotometer set to the following parameters:

| | |
|---|---|
| Measuring Geometry | 0°/45° |
| Spectral Range | 380-730 nm |
| Spectral Interval | 10 nm |
| Illuminant | D65 |
| Observer | 2° (CIE 1931) |
| Density | Ansi A |
| External Filler | None |

Light and Ozone fastness were assessed by the percentage change in the optical density of the print, where a lower figure indicates higher fastness, and the degree of fade.

Ozone Fastness

| Ink | SEC | PR101 | HPP |
|---|---|---|---|
| Ink 3 | 7 | 12 | 11 |
| Ink 8 | 7 | 11 | 9 |
| Ink 27 | 7 | 6 | 9 |
| Ink 35 | 7 | 6 | 12 |

Light Fastness

| Ink | SEC | PR101 | HPP |
|---|---|---|---|
| Ink 3 | 1 | 8 | 7 |
| Ink 8 | 6 | 11 | 9 |
| Ink 27 | 5 | 1 | 13 |
| Ink 35 | 5 | −6 | 6 |

Clearly the dyes of the present invention yield prints with excellent light and ozone fastness.

Further Inks

The inks described in Tables A and B may be prepared using the compound of Example 1. The dye indicated in the first column is dissolved in 100 parts of the ink as specified in the second column on. Numbers quoted in the second column onwards refer to the number of parts of the relevant ink ingredient and all parts are by weight. The pH of the ink may be adjusted using a suitable acid or base. The inks may be applied to a substrate by ink-jet printing.

The following abbreviations are used in Tables A and B:
PG=propylene glycol
DEG=diethylene glycol
NMP=N-methylpyrrolidone
DMK=dimethylketone
IPA=isopropanol
2P=2-pyrrolidone
MIBK=methylisobutyl ketone
P12=propane-1,2-diol
BDL=butane-2,3-diol
TBT=tertiary butanol

TABLE A

| Dye | Water | PG | DEG | NMP | DMK | IPA | 2P | MIBK |
|---|---|---|---|---|---|---|---|---|
| 2.0 | 80 | 5 | | 6 | 4 | | 5 | |
| 3.0 | 90 | | 5 | 5 | | | | |
| 10.0 | 85 | 3 | | 3 | 3 | | 6 | |
| 2.1 | 91 | | 8 | | | | | 1 |
| 3.1 | 86 | 5 | | | | 4 | | 5 |
| 1.1 | 81 | | | 9 | | 10 | | |
| 2.5 | 60 | 4 | 15 | 3 | 3 | 6 | 5 | 4 |
| 5 | 65 | | 20 | | | 10 | 5 | |
| 2.4 | 75 | 5 | 10 | | 5 | | | 5 |

TABLE A-continued

| Dye | Water | PG | DEG | NMP | DMK | IPA | 2P | MIBK |
|-----|-------|----|----|-----|-----|-----|----|------|
| 4.1 | 80 | 3 | 5 | 2 | 10 | | | |
| 3.2 | 65 | | 5 | 4 | 6 | 5 | 10 | 5 |
| 5.1 | 96 | | | | | | 4 | |
| 10.8 | 90 | 5 | | | 5 | | | |
| 10.0 | 80 | 2 | 6 | 2 | 5 | 1 | 4 | |
| 1.8 | 80 | | 5 | | | | 15 | |
| 2.6 | 84 | | | 11 | | | 5 | |
| 3.3 | 80 | 4 | | | 10 | | | 6 |
| 12.0 | 90 | | | | 7 | 3 | | |
| 5.4 | 69 | 2 | 20 | 2 | 1 | | 3 | 3 |
| 6.0 | 91 | | | 4 | | | 5 | |

TABLE B

| Dye Content | Water | PG | DEG | NMP | TBT | BDL | PI2 |
|-------------|-------|----|----|-----|-----|-----|-----|
| 3.0 | 80 | 20 | | | | | |
| 9.0 | 90 | | 5 | | | | 5 |
| 1.5 | 85 | 5 | 5 | | 5 | | |
| 2.5 | 90 | | 6 | 4 | | | |
| 3.1 | 82 | 4 | 8 | | | | 6 |
| 0.9 | 85 | | 10 | | | 5 | |
| 8.0 | 90 | | 5 | 5 | | | |
| 4.0 | 70 | | 10 | 4 | | 5 | 11 |
| 2.2 | 75 | 10 | 10 | 3 | | 2 | |
| 10.0 | 91 | | | 9 | | | |
| 9.0 | 76 | | 9 | 7 | 3 | 5 | |
| 5.0 | 78 | 5 | 11 | | | 6 | |
| 5.4 | 86 | | | 7 | 7 | | |
| 2.1 | 70 | 5 | 10 | 5 | 5 | 5 | |
| 2.0 | 90 | | 10 | | | | |
| 2 | 88 | | 12 | | | | |
| 5 | 78 | | | 5 | | 7 | 10 |
| 8 | 70 | 2 | 20 | 8 | | | |
| 10 | 80 | 10 | 10 | | | | |
| 10 | 80 | | 20 | | | | |

The invention claimed is:

1. A mixture of azaphthalocyanine compounds of Formula (1) and salts thereof:

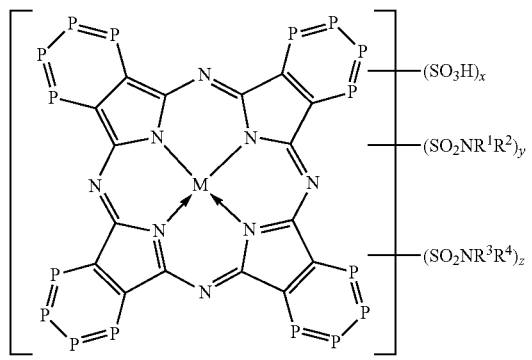

Formula (1)

wherein:
M is 2H, Cu or Ni;
each P is independently CH or N;
$R^1$ is H or optionally substituted $C_{1-4}$alkyl;
$R^2$ is H or optionally substituted $C_{1-8}$alkyl;
$R^3$ is H or optionally substituted hydrocarbyl; and
$R^4$ is optionally substituted hydrocarbyl; or
$R^3$ and $R^4$ together with the nitrogen atom to which they are attached represent an optionally substituted heterocyclic ring system;
x is greater than 0 and less than 4;
y is greater than 0 and less than 4;
z is greater than 0 and less than 4;
the sum of x+y+z is in the range of from 1 to 4 and
provided that at least one P is N and that no more than two P groups in any one of the four component rings of the azaphthalocyanine nucleus are N.

2. A mixture of azaphthalocyanine compounds of Formula (1), as claimed in claim 1, of Formula (5) and salts thereof:

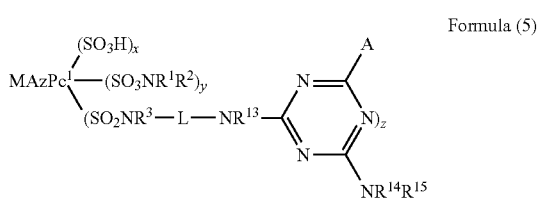

Formula (5)

wherein:
$MAzPc^1$ represents an azaphthalocyanine nucleus of formula

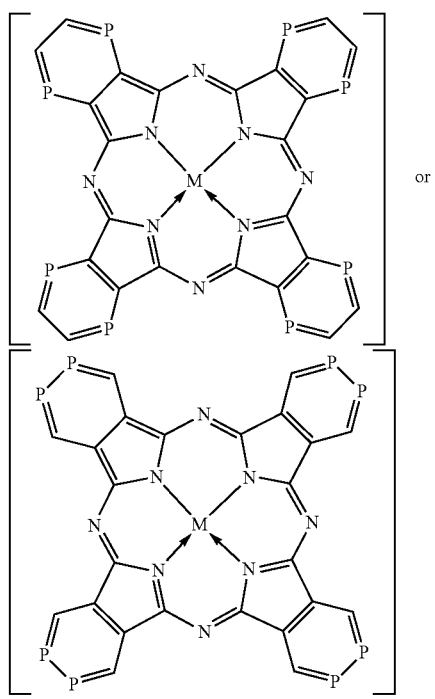

M is 2H, Cu or Ni;
each P is independently CH or N;
$R^1, R^2, R^3, R^{13}, R^{14}$ and $R^{15}$ are independently H or optionally substituted $C_{1-4}$alkyl;
L is optionally substituted $C_{1-4}$alkylene;
A is selected from the group consisting of —$OR^{16}$, —$SR^{17}$ and —$NR^{16}R^{17}$;
$R^{16}$ and $R^{17}$ are independently H, optionally substituted alkyl, optionally substituted aryl or optionally substituted heterocyclyl;
x is greater than 0 and less than 4;
y is greater than 0 and less than 4;
z is greater than 0 and less than 4;
the sum of x+y+z is in the range of from 1 to 4; and
provided that at least one P is N in any one of the four component rings of the azaphthalocyanine nucleus.

3. A mixture of azaphthalocyanine compounds, of Formula (1) as claimed in claim 1, of Formula (6) and salts thereof:

Formula (6)

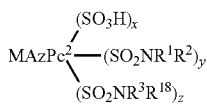

wherein:

MAzPc² represents an azaphthalocyanine nucleus of formula

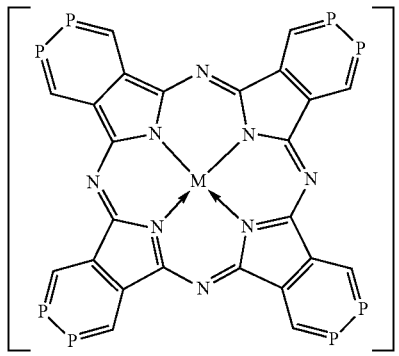

M is 2H, Cu or Ni;
each P is independently CH or N;
$R^1$, $R^2$ and $R^3$ are independently H or optionally substituted $C_{1-4}$alkyl;
$R^{18}$ is optionally substituted $C_{1-8}$alkyl directly carrying at least one optionally substituted phenyl;
x is greater than 0 and less than 4;
y is greater than 0 and less than 4;
z is greater than 0 and less than 4;
the sum of x+y+z is in the range of from 1 to 3; and
provided that at least one P is N in any one of the four component rings of the azaphthalocyanine nucleus.

4. A mixture of azaphthalocyanine compounds, of Formula (1) as claimed in claim 1, of Formula (7) and salts thereof:

Formula (7)

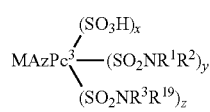

wherein:

MAzPc³ represents an azaphthalocyanine nucleus of formula

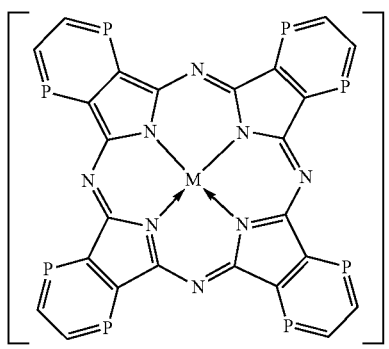

M is 2H, Cu or Ni;
each P is independently CH or N;
$R^1$, $R^2$ and $R^3$ are independently H or optionally substituted $C_{1-4}$alkyl;
$R^{19}$ is optionally substituted $C_{1-8}$alkyl directly carrying at least one substituent selected from the group consisting of —OH, —$SO_3H$, —$CO_2H$ and —$PO_3H_2$ or optionally substituted phenyl carrying at least one substituent selected from the group consisting of —$SO_3H$, —$CO_2H$ and —$PO_3H_2$;
x is greater than 0 and less than 4;
y is greater than 0 and less than 4;
z is greater than 0 and less than 4;
the sum of x+y+z is in the range of from 1 to 3; and
provided that at least one P is N in any one of the four component rings of the azaphthalocyanine nucleus.

5. A mixture of azaphthalocyanine compounds and salts thereof as claimed in claim 2 wherein at least one of the groups represented by $R^{16}$ and $R^{17}$ carries at least one substituent selected from the group consisting of —$SO_3H$, —$CO_2H$ and —$PO_3H_2$.

6. A mixture of azaphthalocyanine compounds and salts thereof as claimed in claim 2 wherein A is —OH, —$NHCH_3$, —$N(CH_3)_2$, —$NHC_2H_4SO_3H_2$, —$N(CH_3)C_2H_4SO_3H_2$, —$NC_3H_6SO_3H$, —NHdisulfophenyl, —NHsulfophenyl, —NHcarboxyphenyl or —NHdicarboxyphenyl, —NHsulfonaphthyl, —NHdisulfonaphthyl, —NHtrisulfonaphthyl, NHcarboxynaphthyl, NHdicarboxynaphthyl, NHtricarboxynaphthyl, —N Hsulfoheterocyclyl, —NHdisulfoheterocyclyl or —N Htrisulfoheterocyclyl.

7. A mixture of azaphthalocyanine compounds and salts thereof as claimed in claim 3 wherein $R^{18}$ is $C_{1-4}$alkyl carrying at least 1 phenyl substituent wherein the phenyl substituent carries 1 or 2 water solubilising groups selected from the group consisting of —$SO_3H$, —$CO_2H$ and —$PO_3H_2$.

8. A mixture of azaphthalocyanine compounds and salts thereof as claimed in claim 4 wherein $R^{19}$ is $C_{1-4}$alkyl carrying 1 or 2 substituents selected from the group consisting of —OH, —$SO_3H$, —$CO_2H$ and —$PO_3H_2$ or phenyl carrying 1 or 2 substituent selected from the group consisting of —$SO_3H$ and —$CO_2H$.

9. An azaphthalocyanine compound of Formula (1) and salts thereof as claimed in claim 1 wherein M is Cu.

10. A mixture of azaphthalocyanine compounds of Formula (1) and salts thereof as claimed in claim 1 wherein $R^1$, $R^2$ and $R^3$ are independently H or methyl.

11. A mixture of azaphthalocyanine compounds and salts thereof as claimed in claim 1 wherein the sum of (x+y+z) is 3.

12. A mixture of dyes comprising azaphthalocyanine compounds of Formula (1) and salts thereof, as claimed in claim 1, obtainable by a process which comprises a cyclisation step wherein phthalic acid or a suitable analogue thereof is mixed with a nitrogen heteroaryl dicyano or dicarboxylic acid.

13. A composition comprising a mixture of azaphthalocyanine compounds and salts thereof of as described in claim 1 and a liquid medium.

14. A process for forming an image on a substrate comprising applying a composition, as described in claim 13, thereto by means of an ink-jet printer.

15. A material printed by means of a process according to claim 14.

16. An ink-jet printer cartridge comprising a chamber and a composition as described in claim 13, wherein the composition is in the chamber.

* * * * *